June 14, 1932. A. L. KRONQUEST 1,863,447
PROCESS OF STERILIZING FOOD PRODUCTS IN CONTAINERS
Filed Nov. 24, 1930
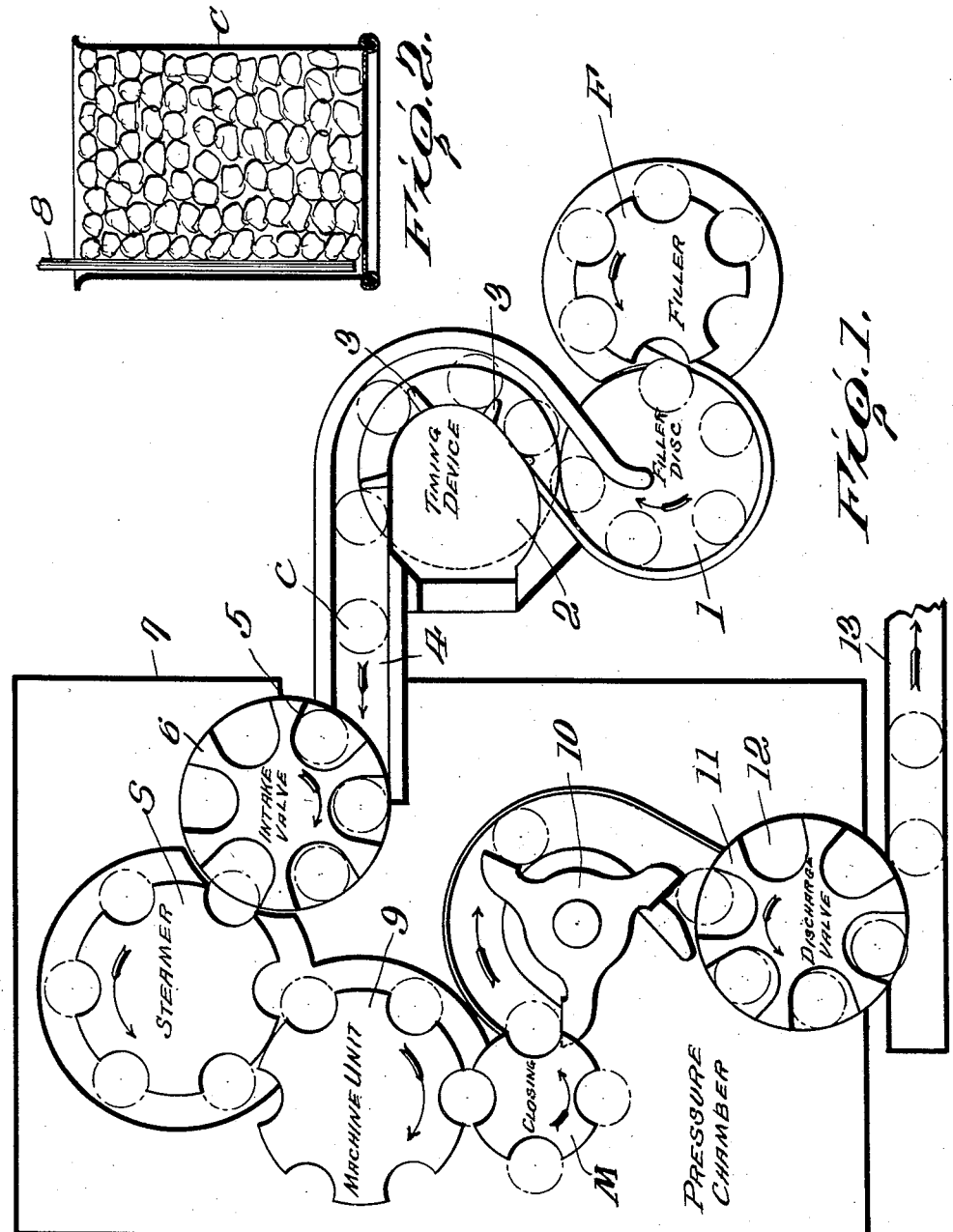
Inventor
ALFRED L. KRONQUEST
By Sturtevant Mason & Porter
Attorneys Patented June 14, 1932

1,863,447

UNITED STATES PATENT OFFICE

ALFRED L. KRONQUEST, OF SYRACUSE, NEW YORK, ASSIGNOR TO CONTINENTAL CAN COMPANY, INC., OF NEW YORK, N. Y., A CORPORATION OF NEW YORK

PROCESS OF STERILIZING FOOD PRODUCTS IN CONTAINERS

Application filed November 24, 1930. Serial No. 497,931.

The invention relates to new and useful improvements in a process for sterilizing food products in containers and to an apparatus for carrying out the process.

An object of the invention is to provide a process of sterilizing food products in containers wherein steam is brought into contact with the food product in the container, while said food product in the container is subjected to a pressure substantially greater than atmospheric pressure.

A further object of the invention is to provide a process of the above type wherein steam is directed into the container and into the food product at a pressure greater than that to which the food product is subjected.

A further object of the invention is to provide a process of the above type wherein the container is closed, while maintained at substantially the pressure at which it is treated with steam.

A still further object of the invention is to provide an apparatus to carry out the process above referred to.

In the drawing:—

Figure 1 is a view in plan showing more or less diagrammatically an apparatus for carrying out the process.

Figure 2 is a detail in section showing the manner of directing the steam into the food product in the container.

The invention has to do with the process of sterilizing food products in containers. The food product is packed in a container and is treated therein before the cover is applied to the container. The container with the food product therein is placed in a chamber which is subjected to pressure greater than atmospheric pressure. Preferably the pressure on the chamber is fifteen pounds above atmospheric pressure. Steam is introduced into the food product in the container at a pressure greater than the pressure in the chamber. This is preferably accomplished by means of a tube which is inserted in the container along the side wall thereof to a point adjacent the lower end of the container. Steam is supplied through this pipe to the food product. The steam is preferably in a saturated condition so that it will very quickly condense and give up the latent heat contained therein as it contacts with the food product. The steam is preferably introduced into the food product at a pressure of approximately thirty pounds above atmospheric pressure. This will cause the steam to pass up through the food product and out through the opened end of the container into the chamber. Inasmuch as the liquid content of the food product is under pressure of fifteen pounds to the square inch above atmospheric pressure, the liquid content will not boil until a temperature is reached of 250° F. This sterilizing of the food product through the latent heat given up by the steam quickly raises the content of the container to a sterilizing temperature. Food products sterilized or processed at this high temperature retain their fresh appearance and flavor, and are far superior to food products packed under present day methods. After the food product has been thoroughly sterilized in the manner described, the pipe is withdrawn and a cover placed on the container and sealed thereto. This is preferably accomplished by a double seaming machine which rolls the edge of the cover and the flange on the body of the container into a seam. This is all accomplished within the chamber which is maintained at a pressure of fifteen pounds above atmospheric pressure. After the containers have been closed they are removed from the chamber and may be rolled for about five minutes to insure equal distribution of heat units within the sealed container. This may be accomplished under air pressure, if desired, to relieve the strain on the can. With ordinary packers' cans this is not necessary, and the can or container may be cooled in the usual way.

Possibly a better understanding of the process will be had from a description of the apparatus which may be utilized for carrying out the process. The apparatus consists in the main of devices which are well known, and therefore the apparatus has only been illustrated diagrammatically. The cans are fed to a filler machine indicated at F in the drawing. Here as usual the food product and the syrup or liquid content are placed in the container, and it is filled ready for closing. The cans are delivered by the filler onto a filler disc 1 and are directed into a timing mechanism 2 having traveling fingers 3, 3 which separate the containers and space the same for feeding into the pockets of a rotating valve. The containers are then carried along a runway 4 by suitable conveyor and delivered in succession into the pockets 5 of a rotating valve 6. The containers are indicated at C in the drawing. The valve 6 controls the entrance to a chamber 7 which is a closed chamber, and which is placed under a pressure preferably fifteen pounds to the square inch above atmospheric pressure. The containers are delivered by the valve 6 to a steamer indicated at S in the drawing. This steamer has a series of steam supplying units, each of which is provided with a pipe 8 as shown in Figure 2 of the drawing. After the container has been placed at the steaming unit the pipe 8 is inserted in the container by passing the same down adjacent the outer wall of the container, so as not to disturb the food product, and then steam is admitted into the container through this pipe 8. The pipe 8 is connected with a suitable source of saturated steam supply preferably maintained at a pressure approximately thirty pounds per square inch above atmospheric pressure. A suitable valve is provided for controlling the pipe 8, and steam is admitted to the food product and caused to pass up through the food product and the liquid content of the container. Thus it is that the food product is brought into contact with this saturated steam which is forced through the food product, and inasmuch as the liquid content of the container is maintained under a pressure of fifteen pounds above atmospheric pressure, the food product may be heated to a temperature of 250° F. without resulting in the boiling of the liquid content of the container. The saturated steam coming into contact with the food product is condensed and gives up its latent heat which becomes effective to sterilize the food product. The food product will, therefore, be very quickly sterilized and will maintain its appearance and flavor, and a superior quality of food product thus produced. After the steam has been passed through the food product for a sufficient time interval to bring about the thorough sterilization of the same the pipe is removed and the containers are delivered to a transfer unit 9 and delivered to one of the seaming units of a closing machine M. The covers are double seamed onto the container body of this machine, and thus the containers are hermetically closed. The containers, after they are closed, are delivered to a take-away 10 which delivers the containers to a valve 11 having a series of pockets 12 therein, and the containers are discharged from this valve onto a conveyor 13. The valves 6 and 11 close the chamber 7, and at the same time they deliver the filled containers to the chamber and remove the containers from the chamber after they have been treated and closed.

From the above it will be apparent that I have provided a process and an apparatus for carrying out the same, wherein the food product in the container may be very quickly sterilized by the use of saturated steam coming in direct contact with the food contact, while the food product is maintained at a pressure far in excess of atmospheric pressure. Thus it is that the latent heat of the saturated steam may be utilized for quickly subjecting the food product to a temperature of 250° F. or more for effecting the quick and rapid sterilization or processing of the food product.

While I have described the specific pressures which are preferably used, and the specific temperature which is attained in the sterilizing of the food product, it will be understood that the invention is not limited to these specific pressures or temperatures. The essential feature of the invention is the subjecting of the food product to the intimate contact with the saturated steam, while subjected to a pressure above atmospheric pressure so that the sterilizing temperature may be well above the temperature at which liquids boil at atmospheric pressure. While I have described the steam as preferably saturated steam, so that the benefit of the latent heat can be more efficiently obtained, it will be understood that on certain aspects of the invention, dry or super-heated steam may be used.

Having thus described the invention, what I claim as new and desire to secure by Letters Patent, is:—

1. A process of sterilizing food products in containers consisting in subjecting the filled container to a pressure above atmospheric pressure, passing steam under pressure greater than that on the food product into and through the food product, discontinuing the application of the steam to the food product, and covering and sealing the container while maintained at substantially the pressure on the food product during treatment.

2. A process of sterilizing food products in containers consisting in filling the container, placing the container with the cover off in a chamber maintained at a constant pressure of substantially fifteen pounds above atmospheric pressure, placing a tube in said container and passing steam at a pressure of substantially thirty pounds above atmospheric pressure through said pipe and into the food product, discontinuing the steam and withdrawing the pipe, and covering and sealing the container while in the chamber.

3. A process of sterilizing food products and hermetically sealing the same in containers consisting in subjecting the food product to a pressure above atmospheric pressure, passing steam under pressure greater than that on the food product into and through the food product, discontinuing the application of the steam to the food product, and hermetically sealing the food product in a container while maintained at substantially the pressure on the food product during treatment.

In testimony whereof, I affix my signature.

ALFRED L. KRONQUEST.